US006886748B1

(12) United States Patent
Moore

(10) Patent No.: US 6,886,748 B1
(45) Date of Patent: May 3, 2005

(54) APPARATUS AND METHOD FOR PURCHASED PRODUCT SECURITY

(76) Inventor: Steven Jerome Moore, 58 Butterfield Rd., Newtown, CT (US) 06470

( * ) Notice: Subject to any disclaimer, the term of this patent is extended or adjusted under 35 U.S.C. 154(b) by 0 days.

(21) Appl. No.: 09/344,010

(22) Filed: Jun. 25, 1999

Related U.S. Application Data

(63) Continuation-in-part of application No. 08/581,804, filed on Jan. 2, 1996, now abandoned.

(51) Int. Cl.[7] .................................................. G06K 7/00
(52) U.S. Cl. ...................... 235/435; 235/383; 235/375; 705/22; 705/28
(58) Field of Search ................................. 235/383, 375, 235/384, 385, 435, 381, 380, 462.01, 468, 487, 494; 705/22, 24, 28, 14, 16, 17, 44

(56) References Cited

U.S. PATENT DOCUMENTS

| | | |
|---|---|---|
| 1,364,025 A | 12/1920 | Billings |
| 1,887,324 A | 11/1932 | Pocoroba |
| 3,691,350 A | 9/1972 | Kuhns et al. .......... 235/61.7 B |
| 4,280,119 A | 7/1981 | May .................... 340/147 MD |
| 4,330,669 A | 5/1982 | Farrow ................. 219/121 LD |
| 4,373,159 A | 2/1983 | Leavitt et al. .......... 343/6.5 R |
| 4,467,172 A | 8/1984 | Ehrenwald et al. ... 219/121 LH |
| 4,822,973 A * | 4/1989 | Fahner et al. ............ 219/121.6 |
| 4,889,367 A | 12/1989 | Miller .......................... 283/88 |
| 5,083,814 A | 1/1992 | Guinta et al. .................. 283/70 |
| 5,168,477 A | 12/1992 | Schenato et al. ............. 367/87 |
| 5,206,496 A | 4/1993 | Clement et al. ............ 250/271 |
| 5,268,566 A | 12/1993 | Wakaumi et al. ........... 235/493 |
| 5,360,628 A | 11/1994 | Butland ......................... 427/7 |
| 5,367,148 A | 11/1994 | Storch et al. ............... 235/375 |
| 5,401,561 A | 3/1995 | Fisun et al. ................. 428/195 |
| 5,401,960 A | 3/1995 | Fisun et al. ................. 250/271 |
| 5,411,799 A | 5/1995 | Loving ........................ 428/343 |
| 5,434,394 A * | 7/1995 | Roach et al. ............... 235/375 |
| 5,485,789 A | 1/1996 | Collier ........................ 102/501 |
| 5,501,655 A | 3/1996 | Rolt et al. ..................... 601/3 |
| 5,521,815 A | 5/1996 | Rose, Jr. ...................... 364/409 |
| 5,592,561 A * | 1/1997 | Moore ........................ 347/107 |
| 5,623,552 A * | 4/1997 | Lane ........................... 235/492 |
| 5,646,365 A * | 7/1997 | Collier ........................ 102/501 |
| 5,713,485 A * | 2/1998 | Liff et al. .................... 221/129 |
| 5,768,384 A * | 6/1998 | Berson ........................ 235/385 |
| 5,793,030 A * | 8/1998 | Kelly, Jr. .................... 235/383 |
| 5,970,469 A * | 10/1999 | Scroggie et al. ............. 705/14 |
| 5,992,742 A * | 11/1999 | Sullivan et al. ............. 235/375 |
| 6,076,064 A * | 6/2000 | Rose, Jr. ........................ 705/1 |

* cited by examiner

Primary Examiner—Michael G. Lee
Assistant Examiner—Ahshik Kim

(57) ABSTRACT

There is disclosed a method and apparatus for encoding products with unique identifiers which are correlatable with the purchaser of a product. Data related to the purchaser is correlated at point of purchase with the unique identifier and stored in a database for latter retrieval upon theft or loss.

20 Claims, 8 Drawing Sheets

APPARATUS AND METHOD FOR PURCHASED PRODUCT SECURITY

This is a continuation-in-part application of and claims priority to U.S. patent application Ser. No. 08/581,804, filed Jan. 2, 1996, now abandoned, entitled "Method and Apparatus for Purchased Product Security."

BACKGROUND OF THE INVENTION

1. Field of Invention

The present invention relates generally to an apparatus and method for encoding unique identifiers on products and correlating the identifiers with the identity of the purchasers of the products. The invention encompasses means for encoding unique, concealed identifiers on products.

2. Brief Description of the Prior Art

Hundreds of millions of dollars are lost each year in the United States owing to the theft of household goods. A significant problem associated with return of stolen goods is identifying the rightful owner of the stolen good. For example, more than one brand X television is reported stolen in New York City each day.

In general, persons seeking return of goods stolen from their possession have to prove that particular goods belong to them and not to some other victim of a theft. Heretofore, the best way of correlating a particular item with ownership was to keep a record of the serial number which is often engraved on, or attached to, the surface of a product.

The method of attaching a serial number plate to, or engraving a serial number on, a consumer good is well known in the art. Such method is exemplified in U.S. Pat. No. 4,936,608, in which industrial products are marked by "burning-in" alphanumeric numbers by means of a laser.

Promotional literature which comes with a new consumer products not infrequently includes a card with the serial number imprinted thereon. Recordation of ownership may be made by mailing the card into the manufacturer. Commonly, however, many of these cards are never returned by the purchaser and are subsequently discarded.

One significant problem associated with visible serial numbers, whether on a plate or engraved on the product, is that they provide for visual inspection of the serial number not only by the consumer of the good, but also by the thief. Thieves often eradicate visible serial numbers on stolen goods. Once the serial number has been removed, it is often impossible to correlate the true owner with the stolen item.

In order to prevent thieves from eradicating all serial number identifications from a product, it has been proposed that the serial number be printed on the product with invisible ink. For example, in U.S. Pat. No. 5,194,289, ultraviolet dyes are employed to imprint identification numbers. Similarly, in U.S. Pat. No. 5,360,628 an infra-red absorbing dye, IR 140 (5,5'-dichloro-11-diphenylamino-3, 3'-diethyl-10, 12-ethylenethiatricarbocyanine perchlorate (CAS53655-17-7)) and invisible electrically conductive inks are disclosed. Others have proposed using biologic material for the concealed, unique identification of a product. U.S. Pat. No. 5,194,289 utilizes biologic markers, such as amino acids, proteins, and nucleic acids to identify an object U.S. Pat. No. 4,880,750 discloses the use of individual-specific antibodies in an ink for identification of security documents. U.S. Pat. No. 4,441,943 uses synthetic polypeptides for labeling explosives.

Invisible ink or material on the surface of the product also presents problems. Although more difficult for a thief to discern, such printing is usually easily removable from the surface of the product. Further, it is often difficult for law enforcement officials to determine where the invisible marking is located.

Both engraving of a serial number or the attachment of a serial number plate onto a product and the imprinting the surface of the product with invisible material provides for no direct mechanism of identifying the particular product with the purchaser of the product. Heretofore, as set forth above, the conventional means by which a particular product was identified with a purchaser was by means of consumer or retailer registration of ownership with the manufacturer by mailing in the serial number identification card.

In order to resolve these problems, it has been proposed in U.S. Pat. No. 5,083,814 that valuable personal articles be marked with an invisible ink at random locations on an article, such location being chosen by computer programmed to chose one of several hundred possible marking sites, and that the installer of the security marking record and input data pertaining to the ownership of the article in a limited-access central database. While this system provides for protection of the initial purchaser of a valuable good, it does not provide a method for registering subsequent purchasers, nor does it provide a method of automatically registering the purchaser of every day consumer goods. Further, while making it more difficult for a thief to discern the serial number, such technique does not prevent the thief from "filing-off" the serial number once it is discovered by means of an infra-red sensor, etc.

The correlation of a product with the purchaser of that product is also a problem in identifying the perpetrator of a crime. For example, criminals are adept at finding and removing serial numbers engraved on firearms. The discovery of a firearm at a crime scene often provides police with little clue about the perpetrator of the crime. Likewise, heretofore, it has been very difficult for police to correlate the purchaser of ammunition with the slug found in a body. Visibly marking the ammunition with a serial number and correlating the same with a purchaser have been proposed. Again the problem with such a system is that the visible serial number is easily removed by a criminal disposed to do such.

SUMMARY OF PRESENT INVENTION

The present invention provides for an apparatus capable of concealingly encoding unique identifiers on goods without the need for employing invisible inks or biological materials. It further provides for a computer-assisted system for automatically storing personal information on the purchaser of a consumer good and correlating such information with the unique identifier placed on a product by any means.

In one embodiment of the invention, a unique identifier is concealed within the material comprising the product. A plurality of high energy electromagnetic or particulate waves capable of partial transmission into the material to be marked are converged at a focal point within the material. It is preferred that each individual wave is of insufficient energy to substantially disrupt the surface of the material which is to be encoded. However, the totality of the convergent wave energies must be sufficient to disrupt the material at their point of convergence. In a preferred encoding embodiment the convergence point is controlled by computer modulation. Movement of the convergence point within the material is used to provide a unique identifier in the material. The convergence point may be altered such that unique lines are made in the subsurface of the product such that a bar code identifier is formed. While the scope of the invention is not limited to any particular high energy electromagnetic or particulate wave, microwaves are within its scope. Encoding may further be performed by the convergence of sound waves, such as ultrasonic waves, when such waves are capable of deforming the material at the point of their convergence but not causing substantial deformation at the surface of the material itself. Encoding may be performed shortly after a component of the good comes out of the mold, that is, e.g., while a piece of metal or plastic is solidifying and cooling. Encoding may also be performed along a different x-y-z axis in the material during different production runs, such position of encoding being stored in a database maintained by the manufacturer of the material. Identifiers stored within the material comprising the product may be read by conventional devices such as ultrasound devices, computer-assisted axial tomography machines, or the use of x-ray devices.

The present invention further provides a computer-assisted method for correlating unique identifiers on products with identification information about the purchaser of the product or the good's manufacture or source of origin. In one embodiment, personal identification information housed on a credit card, license, check, etc., is correlated with the unique identifier which is on the product. In a preferred embodiment, the unique identifier is encoded not only on the product but also on the outside of the container which houses the marked product which is being sold. The personal identification information is coupled to the identifier information on the package and such coupled information is stored in a database for latter retrieval if the item is stolen, lost, etc., and later recovered. The invention encompasses the notion that the consumer identification information coupled to the unique product identifier may be retrieved by means of the identifier on the check etc., (i.e., from a computer database containing information about the purchaser of the product), rather than the identifier on the check, etc. being coupled directly to the unique product identifier. Encoding may be as described above, or may be performed by placing an identifier on the surface of the product with invisible ink or other material detectable by electronic or chemical means but not by the human eye, or by placing a visible identifier on the surface the product.

A further aspect of the present invention is directed to encoding concealed unique identifiers on products by: directing a plurality of high energy electromagnetic waves at material comprising the product such that the convergence point of the waves is within the material; altering the convergence point of said high energy electromagnetic waves such that the three-dimensional structure of the material within the product is disrupted such that said unique identifier is formed. The encoding may be performed on material which is in a molten or semi-molten state.

Also disclosed is system for reading the encoding and comparing the same to information contained in a database comprising: a scanning device capable of discerning the internal contour of materials and reading an internal encodation, a computer database relating the internal encodation with information pertaining to the purchaser of a good or the good's manufacture or source of origin, a processing device for correlating the information in the computer database with internal encodation discerned by said scanning device.

And yet a further aspect of the present invention is directed to a method of identifying the owner of a good, or the good's manufacture or source of origin, comprising: encoding a unique identifier on a product; placing a visible electronically-readable package identifier correlatable with or identical to, said unique identifier on the product; inputting said visible electronically-readable package identifier with information pertaining to the purchaser of the product, the good's manufacture or source of origin; maintaining a database correlating the unique identifier with the information pertaining to the purchaser of the product, the good's manufacture or source of origin; reading said unique product identifier; and retrieving information pertaining to the purchaser of the product, the good's manufacture or source of origin from said database by means of providing the unique product identifier. The method encompasses the concepts that the product encoding may be concealed, the visible electronically-readable package identifier input by electronic means, and the information pertaining to the purchaser of the product, the good's manufacture or source of origin input by electronic means.

The electronically-readable package identifier may constitute a unique package identifier which not only can be used to determine the unique product identifier of the product to which the package identifier is attached but includes other information pertaining to the manufacture of the good such as the manufacturer of the good, the type of good (i.e., what the item is, e.g. a picture, lawn chair, mower, etc.), information pertaining to the "characteristics of a good" [a good's physical characteristics (e.g., the size, color, dimensions, features (e.g. having an ac/dc adapter or not)), its requirements for use ("good requirements") (e.g. batteries, oil etc. needed to run the good), and "add-ons" associated therewith (that is, additional features which may be purchased for use with a good (e.g. example an ac/dc adapter), additional items which may enhance the product (e.g. an anti-glare screen for sue with a computer) or which may be useful in use with a product (e.g. a display case for displaying purchased figurines, insurance for the product))] and the "good's origin" (e.g., the location where the good was manufactured, the lot number the good was produced in, the source of the products comprising the good).

An electronically-readable package identifier may incorporate in electronically-readable form information pertaining to the manufacture of the product (e.g. the characteristics of the good), with or without incorporating electronically-readable information correlative with a unique product identifier.

In one embodiment of the present invention a product information identifier which contains information pertaining to manufacture of the product, with or without the unique product identifier, is coupled electronically with the purchaser identifier in a first data storage medium (by "coupled electronically" it is meant associating one stream of information with another stream of information in a format such that the data may be interpreted by a processor and the association made between the information streams subsequently determined, and includes, without limitation, the use of relational databases). The product information identifier in such embodiment is also associated in a data storage medium (which may be the same or different from the first data storage medium) with particular goods and/or services to which identifier may logically be-said to relate, along with purveyor identification information relating to the purveyor of such goods and/or services. Purveyor identification information preferably includes a communication address wherein the purveyor may be contacted (such as an Internet address, IP address, residential address, mail address, e-mail address, telephone number, fax number, telecommunication line address etc.). A processor then determines from the coupled product information identifier-purchaser identifier, and the coupled product information identifier-good/ service-purveyor identification information which other products or services might be desired by the purchaser of a good and the purveyor(s) which sell such products and/or services. For example, the product information identifier may incorporate information pertaining to the need of the product purchased for batteries. A battery purveyor therefore might be notified automatically by the processor, by way of the communication address embodied in the purveyor identification information that the person associated with the purchaser identifier might be in need of batteries. For providing the service of identifying the possible need of the person associated with the purchaser identifier for the product (in this case the batteries) the purveyor might be charged a fee for each notification. Of course, the purveyor need not be provided with the identity of the person who might be in need of its services, or the address or communication path by which such person might be reached, rather the situs housing the processor might send the information which the purveyor wishes to send without the purveyor ever knowing where it was sent. For example, the battery purveyor might want to send the purchaser of a product needing batteries, a coupon for batteries. The situs which makes the comparison might notify the battery purveyor that it has determined someone who might be interested in its services, receive the approval or request of the purveyor to send a coupon to the person (such request may be pre-approved), and then send the coupon without the purveyor ever having actually received any information pertaining to the person to whom the coupon was sent. The situs might then charge the purveyor a fee for its handling of the transaction.

In another embodiment a relational database is maintained wherein information pertaining to good requirements and add-ons is associated with the identity of the good, or unique product identifier. In the same relational database, or another relational database, information pertaining to purveyors of good requirements and add-ons and a communication path to reach the same (e.g. Internet address, IP address, residential address, e-mail address, mail address, telephone number, fax number, telecommunication line address etc.) are related. Such purveyors are referred to as "secondary purveyors" if they are not the purveyor of the product which is initially being purchased. Concurrent with selling a product, information pertaining to the identity of the purchaser is obtained preferably including information pertaining to an appropriate communication path where the purchaser may be contacted (e.g. an actual mailing address may be needed if the product which the purchaser wished to purchase is a tangible product, while an Internet or e-mail address might suffice if the product being purchased is intangible (such as a digital picture or computer program) or a service). By determining, preferably automatically by use of a processor programmed to do the same, the add-ons and good requirements associated with the product which is being purchased, and the secondary purveyors which offer such add-ons and good requirements, the secondary purveyor may be contacted by way of the secondary purveyor communication path to either inquire whether the secondary purveyor wishes to make an offer to the purchaser, or to inform that the secondary purveyor that such an offer has been made to the purchaser (e.g., if such offer is already authorized to be made—in which such case such information may also be associated with the purveyor information).

And yet another embodiment of the present invention is directed to purchases and offers to purchase made by way of a data processing telecommunications network, for example by way of the Internet. In such embodiment, the purchaser purchases, or makes an offer (which may include a bid or barter) for the purchase of, a good through a data processing telecommunications network (e.g. via an "e-commerce" application), and identifying information pertaining to the purchaser/offerer, and/or the particular address (e.g. Internet address, IP address, e-mail address, residential address, mail address, telephone number, fax number, telecommunication line address etc.) from which the purchase/offer was authorized ("purchaser identifier"), is coupled with the unique product identifier, the unique package identifier, and/or product information identifier. The purchaser identifier may include information pertaining to one or more accounts to which the purchaser is authorized to charge a purchase or debit a purchase.

Electronic correlation of the purchaser identifier with the unique product identifier, unique package identifier, and/or product information identifier, or any portion thereof, may be performed at the point where the product which is to be sent to the purchaser is stored (e.g., wholesale house, storage room, retail store, etc.). In such case, the unique product identifier, unique package identifier, and/or product information identifier are preferably electronically scanned and electronically correlated with the purchaser identifier which has already been electronically stored on a data storage medium.

Electronic correlation of the purchaser identifier with the unique product identifier, the package identifier and or product information identifier, or any portion thereof, may also be performed contemporaneous with the tendering of the purchase order or offer to purchase. In such case, a particular pre-manufactured product carrying an unique product identifier, unique product identifier, or a group of pre-manufactured goods carrying a particular product information identifier, are selected for co-processing with the purchaser identifier when the purchase order is tendered, or the offer to purchase is made. Of course, a unique product identifier, unique package identifier, or product information identifier may be correlated with a particular purchaser identifier when the purchase order is tendered, or the offer to purchase is made, and the particular identifier applied to the product or package upon its manufacture or after its manufacture. If the unique product identifier is co-processed with the purchaser identifier at this point, such information can be transmitted to the purchaser or offerer at the same time, such that a record of the unique product identifier which will be borne by the product shipped to the customer may be kept in an database, preferably an electronic database, on both the seller's end and on the purchaser/offerer's end.

Of course the purchaser may record the association of the unique product identifier and/or unique package identifier (and/or package information identifier) with the purchaser by electronically reading and storing such identifiers in a database of purchased products (and thereby stored electronically at the purchaser/offer's situs).

The purchaser identifier may also be coupled with information pertaining to the quality of the product (such as size, dimensions, color, features included) when the offer or acceptance of the offer for purchase is made. The product to be shipped to the purchaser may be selected on the basis of the electronically-readable product information identifier located on the package of the product, such that a correlation between the information encoded in the product information identifier is made with the quality of product information garnered at the time of the offer, or acceptance of the offer, for product purchase. The product information identifier may also subsequently be placed on the good or package of the good meeting the quality of product information which has been requested by the purchaser.

The purchaser identifier, the unique product identifier, the unique package identifier and/or the product information identifier may be added to a product, or the package surrounding the product, or both, by for example using a bar-code, preferably a two dimensional bar-code, prior to shipment of the product to the purchaser of the same.

It is a further embodiment of the present invention to track products having unique product identifiers, unique package identifiers, purchaser identifiers and product information identifiers encoded thereon, as the product moves from point of manufacture to the ultimate consumer and to subsequent consumers (i.e. re-distribution or re-sale). Tracking may electronically correlate the identifier with the location of the product at a particular time (preferably by electronically scanning in location information), or may electronically correlate the identifier with the particular person or persons having custody of the product. Preferably electronic correlation is by electronically reading location information or custodian identification information by an electronic reader and electronically reading the purchaser identifier, the unique product identifier, and/or unique package identifier, and/or product information identifier. By coupling the unique product identifier, and/or unique package identifier, and/or product information identifier, with such location or custody information, it is possible to determine the persons and/or locations where the product has once resided, or presently resides.

The purchaser identifier may be read by an electronic reader from an identity card housing identification information in electronically-readable, or electronically-readable coded form, or may be input manually by way of an operator interface. The identification information which is to be associated with the good identifier is preferably authenticated, by, for example, requiring input of data representative of one or more unique characteristics of the person purporting to buy the object (for example, requiring a signature, a retinal scan, a finger print, or information which would only be known by, or associated with a physical characteristic of, the purported purchaser), which is transmitted to the purveyor of the good along with the purchaser identifier.

The identifier on the surface of the product may be encoded in "electronically-readable coded form." By "electronically-readable coded form" it is meant data stored on or in magnetic form, electrical form, digital form (including storage on an optical disk), or symbolic print (that is, print symbolic of full text, without recourse to characters of conventional international languages and/or numerics, such as Arabic numerals, Roman numerals, English language characters, Chinese language characters, Japanese language characters, Russian language characters, etc.) which is capable of being read by an electro-optical reader. As would be understood by one of ordinary skill in the art, by "electronically-readable coded form" it is not meant to include conventional alpha-numeric printing.

By "coded alpha-numeric printing" it is meant alpha-numeric print which may be interpreted only by means of decoding the print into alpha-numeric characters such that the characters follow standard linguistic rules (such as English, Spanish, French etc.). By "digital encryption" it is meant coding digital data in such a manner that decoding, such as by means of an algorithm, is necessary for interpretation of the data pursuant to standard digital-based languages. The term "encryption" is meant to include both single-key and dual-key (e.g. private and public key) encryption.

By "electro-optical reader" it is meant any electronic-based reader capable of deciphering printed, magnetically and/or electrically stored data and transforming the same into electrical signals, of an analog or digital nature, which is representative of the data stored in the printed, magnetically and or electrically stored data. By "electro-optical reader" it is meant to include, without limitation, standard optical scanners, such as bar-code readers, capable of transmitting a light wave to a coded indicium and decoding the reflected light from the indicium, electromagnetic readers, such as, for example, credit card readers, capable of generating a magnetic field and decoding changes in such magnetic field as the coded indicium is moved through such field, and download readers, such as, for example, "Smart-Card®" readers, accepting a data stream from an electronic memory storage unit stored on a card, such memory storage unit frequently being coupled to an ASIC or microprocessor.

By "bar code" it is meant symbolic print consisting of a coded pattern of indicia. Bar codes may be one-dimensional, conventionally comprising a series of bars of various widths spaced apart from one another to bound spaces of various widths, the bars and spaces having different light reflecting characteristics. One-dimensional bar codes typically serve as an access code that serves as a real-time key for opening a database. Bar codes may also be more complex, such as a two dimensional bar code which consists of numerous indicia dispersed throughout a delimited space which record actual data. A two-dimensional bar code can store text and/or graphics without the need for access to a host relational-database for conversion of the code into the related data. Composite bar codes are also known, such as wherein one bar code type is printed in one ink type having a particular absorption and emission characteristics on top of another bar code type having a different absorption and emission characteristic.

By "identifier" it is meant to include one or more identifiers which identify an item in the manner described. For example, a printed "identifier" may consist of one or more bar codes or indicia physically separated from one another by some distance.

By "processor" it is meant any device for processing an input electrical signal, and for generating a processed electrical signal therefrom according to predetermined protocol, and includes, without limitation, a microprocessor, DSP, ASIC, multiplexer, microchip, controller and other processors currently available in the art, or which in the future may be developed in the art. By "data processor" it is meant a functional unit, whether hardware and/or software, that interprets and executes instructions and consists of at least an instruction control unit and an arithmetic and/or logic unit. By "data storage unit" it is meant any device for storing electronic data, and includes, without limitation, RAM, ROM, hard and floppy data storage disks, optical disks, WORM, tape drives, etc. and other types of electronic data storage devices currently available in the art, or which in the future may be developed in the art.

By "operator interface" it is meant any device permitting input of data by an operator, and includes, without limitation a physical keyboard, a touch screen, a scanner, a switch, e.g. a game pad switch, an electronic mouse, a roller-ball selection device, and other such types of operator interfaces currently available in the art or which in the future may be developed in the art.

By "data processing telecommunication network" it is meant any one of the many data processing network systems used conventionally, including, without limitation, PBX and LAN networks, and the Internet, in which two or more data processing devices communicate with each other and/or with a centralized host. A "data processing telecommunication network" may include any of the many network topologies known, including, without limitation, a star network topology, a ring network topology, a token ring network topology, a bus network topology, and other similar network systems and topologies The term "Internet" is used in the same manner as used by persons of ordinary skill in the art. The term "Internet" describes a widely distributed network connecting users through autonomous networks, such as in industry, education, government and research. Users of the Internet are typically interfaced into the network through a "service provider." The Internet Protocol conventionally provides for transmitting blocks of data, called datagrams, from sources to destinations, where sources and destinations are identified by fixed length packet addresses. The Internet Protocol uses TCP/IP. The Internet Protocol also provides for fragmentation and reassembly of long datagrams, if necessary, for transmission through small-packet networks.

By "retail sale" it is meant a sale of a good to the ultimate user/consumer of the good. Such sale is distinguished from a "wholesale sale" wherein goods are sold to party for resale, as for example, by a wholesaler.

By "address" it is meant any location information, including, without limitation, a residential address, a telephone number, an e-mail address, an Internet address, a fax number, a telex number, a LAN address etc.

By "digital information" it is meant information encoded in an electronic bit stream.

By "package" it is meant a covering which substantially surrounds a product to protect the product from damage prior to end-consumer use and which does not form part of the product itself. A "package" may be comprised of one or more than one material, for example, cardboard and transparent plastic (to permit the good to be seen and displayed). Packages are often designed to permit easier storage of a good, particularly if the good is difficult to store in its natural form (for example, jelly beans).

By "substrate" it is meant any material. By "card" it is meant any substrate in any shape that is easily carried on a person's body and includes, but is not limited to, a polymeric card, a cellulosic-based card, etc. By "identity card" it is meant a card with information thereon intended to identify a particular individual. By "encoded identity card" it is meant a card which carries identity information in electronically-readable coded form. By "self-authenticating identity card" it is meant a card which carries information, such as a picture or signature, or parameters related to an authenticate signature, of the person identified on the card or unique characteristics associated with the person identified on the card (such as a fingerprint), which permits the tenderer of the card to authenticate identity from such information alone. By "self-authenticating electronically-readable encoded identity card" it is meant an "encoded identity card" which carries information, such as a picture or signature or parameters related to an authenticate signature of the person identified on the card or unique characteristics associated with the person identified on the card (such as a finger print or retinal scan) in electronically-readable coded form which can be used to authenticate the identity of the tenderer of the card from such information alone. By "microcircuit technology card" it is meant a card containing an embedded processor (e.g., a microprocessor) that can manipulate and store data, and includes, for example, a "Smart® Card". By "microcircuit technology card reader" it is meant a download reader which accepts a data stream from an electronic memory storage unit found on the microcircuit technology card.

In yet another embodiment, there is disclosed a computer-assisted method of recording the identity of a purchaser of a particular good in a retail setting comprising:

accepting from a purchaser at retail sale a good encoded with a good identifier identifying the manufacturer of a particular good and containing identification characters unique to the particular good, enclosed in a package having a visible electronically-readable coded form package identifier correlatable with the good identifier, the package identifier identifying the type of good, the good's manufacturer, as well as identifying the unique identification characters on the good;

accepting from the purchaser of the good an identity card housing electronically-readable personal identification information;

inputting by an electro-optical reader the personal identification information from the identity card into electronic storage at the point of retail sale of the good, inputting by an electro-optical reader into the electronic storage the visible electronically-readable coded form package identifier at the point of retail sale of the good in tandem with the input of the personal identification information;

correlating the personal identification information with the package identifier in a computer database.

The method of this embodiment may further comprise the step of transferring the correlated data to a shared database with other retailers. The method may optionally comprise the step providing the encoded good identifier to the purchaser in electronically readable coded form on a document for further recordation of a subsequent purchaser of the good. The method may optionally comprise the step of: printing the package identifier and the personal identification information on a sales receipt in electronically readable coded form at the point of retail sale of the good. The method of claim may use a good identifier that is invisible in visible light and may use an identity card which is a self-authenticating electronically-readable coded identity card, such as an identity card which is a microcircuit technology card.

Also disclosed is a process for encoding a product with an identifier uniquely correlatable with the product comprising:

encoding a good with an invisible good identifier in electronically-readable coded form, the good identifier identifying the manufacturer of a particular good and containing identification elements unique to the particular good;

on the good or the packaging of the good, placing a package identifier, in visible electronically-readable coded form, which is correlatable with the invisible good identifier, the package identifier identifying the type of good, the good's manufacturer, as well as the identification elements unique to the particular good.

In such embodiment, the process may employ invisible encoding which is performed below the surface of a material comprising the good. The process may also place the good identifier position on the good in a manner that placement thereof is associated with the lot in which the good was manufactured. The visible electronically-readable package identifier of the process which is placed on the good or the packaging of the good may further identify the type of good, the good's manufacturer, and its manufacture or origin of manufacture. Also disclosed is the product of the process.

Further disclosed is a computer-assisted method of identifying a record owner of the product, or part thereof, of product of the above process comprising:

obtaining the good of such product;

determining the unique invisible good identifier encoded on the good;

inputting the good identifier along with the type of good and the good's manufacturer into a data processor operatively connected with a data base housing purchaser identity information correlated to good identifiers found on goods;

retrieving purchaser identity information correlated with the good identifier in the data base;

determining the identity of the purchaser(s) of the good from the purchaser identity information.

And yet further disclosed is a computer-assisted method of recording the identity of a purchaser of a good purchased through a data processing telecommunications network comprising:

receiving over a data processing telecommunications network a computer data signal comprising digital information relating to the order of a good, the identity of the orderer of the good, and the address to which the orderer of the good desires the good to be transmitted, the computer data signal being transmitted from the orderer's computer to the computer of a purveyor of the good, transmitting from the purveyor's computer in response to the offerer's order a computer data signal comprising a request for the good to a remote computer located at a site remote from the purveyor's computer, the remote computer being located at a site at which such good is physically available as a product comprising the good, and a package surrounding the good, the package having a package identifier in electronically-readable coded form correlatable with the unique good identifier;

receiving a computer data signal from the remote computer comprising digital information with respect to the package identifier and correlating the package identifier digital information with the digital information pertaining to the identity of the offerer and the address to which the offerer desires the good to be transmitted.

Also disclosed is a computer-assisted purchase and sale method comprising:

accepting from a purchaser at the time of purchase of a good digital identification information identifying the purchaser and a contact address of the purchaser;

correlating in a relational database the purchaser digital identification information with an identifier associated with the good purchased by the purchaser;

accessing a relational database correlating the identifier with one or more associated characteristics of the good;

accessing the same or different relational database which correlates associated characteristics of goods with secondary purveyor(s) proffering good or services directed to such associated characteristics and a contact address of the secondary purveyors;

determining from the identifier associated with the purchased good secondary purveyor(s) of good or services directed to associated characteristics of the purchased good;

proffering the purchaser by way of the purchaser contact address good or services proffered by the secondary purveyor(s) which are related to associated characteristics of the purchased good;

contacting the secondary purveyor(s) by way of the secondary purveyor(s) contact address to inform the secondary purveyor(s) of the purchaser's response to the proffer.

In such embodiment the identifier associated with the good being purchased may be selected from the group consisting of: a unique product identifier, a unique package identifier, a product information identifier. The method may entails use of a data processing telecommunication network, for example the Internet.

And yet also disclosed is a method for encoding concealed unique identifiers on products comprising:

directing one or more high energy electromagnetic waves at a material in a molten or semi-molten state such that the wave(s) substantially converge at a point within the material;

altering the convergence point of the high energy electromagnetic wave(s) such that the three-dimensional structure of the molten or semi-molten material is disrupted such that an unique identifier is formed;

using the solidified material in the construct of a product.

Such method may use any type of molten or semi-molten material, such as a plastic.

The present invention further encompasses the concept that the unique identifier may be placed on a bill of sale, receipt, or other similar document in optically visible or invisible electronically-readable coded form or alphanumeric text and that such identifier may be input from such bill of sale, receipt, or other similar document along with personal identifying information of a second person if the product is sold or transferred to a second person. The present invention further encompasses the concept that the unique product identifier may be inserted into an electronic bill of sale, receipt or other similar electronic information which may be downloaded, with or without the purchaser identifier used to purchase the good, into a data storage unit at either, or at both, the purchaser's end or seller's end. The database containing the coupled owner-product identification information is updated by either deleting information pertaining to the previous owner or by addending a date to the information such that a chain of title can be maintained in the database.

BRIEF DESCRIPTION OF THE DRAWINGS

For a more complete understanding of the objects of the present invention, the Detailed Description of the Illustrative Embodiments thereof is to be taken in connection with the following drawings, in which.

DETAILED DESCRIPTION OF THE ILLUSTRATIVE EMBODIMENT OF THE PRESENT INVENTION

Figure 1:
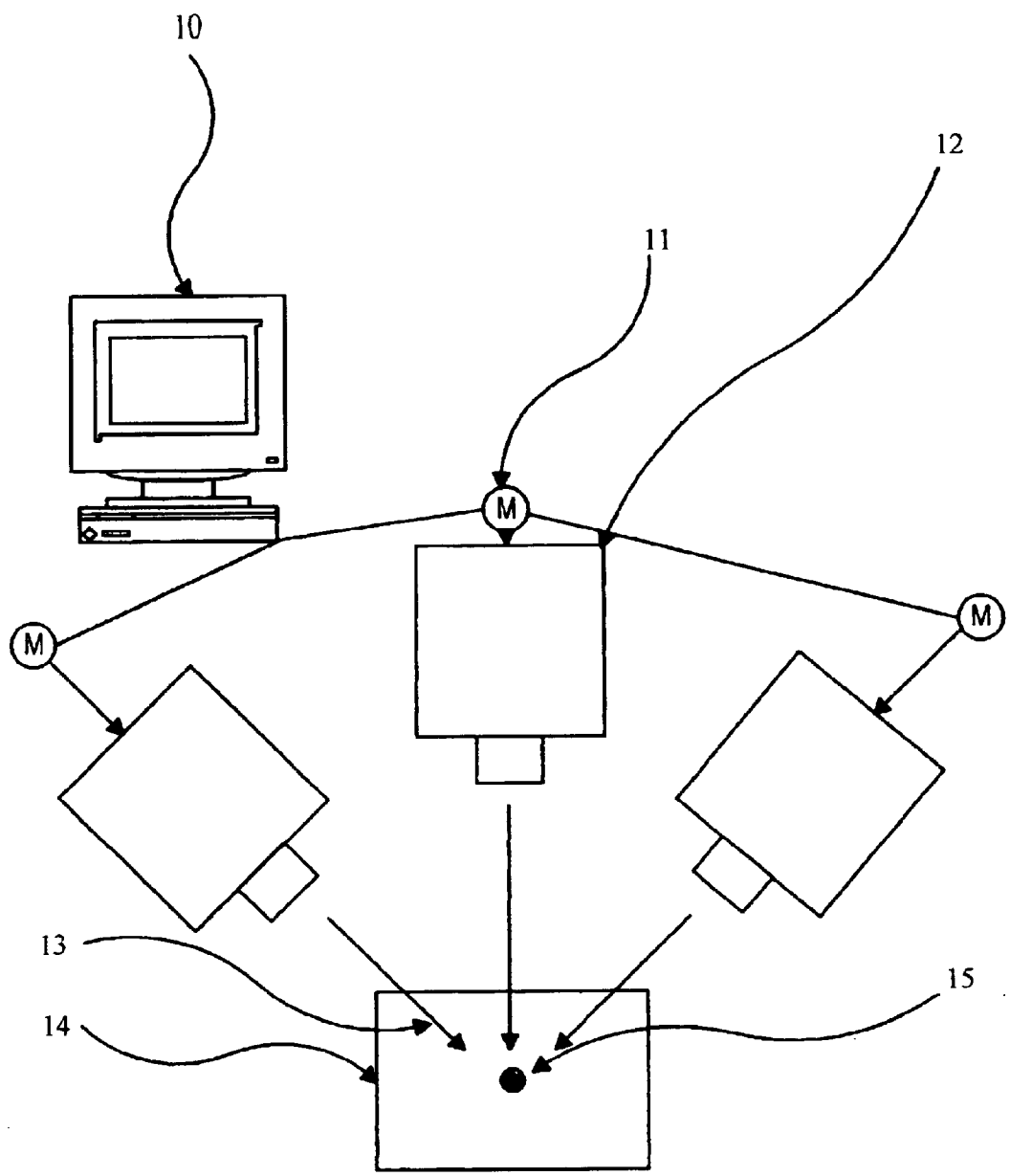
FIG. 1 is a schematic representation of an encoding device for concealing unique identifiers in the sub-surface of materials comprising a product.

Referring to FIG. 1 of the drawings, there is shown an exemplary encoding device capable of placing unique product identifiers within the material comprising a product. Such device is comprised of a plurality of high energy electromagnetic wave generators 12 for generating waves 13 that impinge upon the surface of material 14 without substantially disrupting the same and that penetrate at a convergence point at a specified depth within the interior of material 15. Typically, the wave generators 12 are coupled to a data processing device such as computer 10 which controls the movement of the convergence point along the x-y-z axis of the material via a plurality of motors 11, such multiple control being well known in the art.

Figure 2:
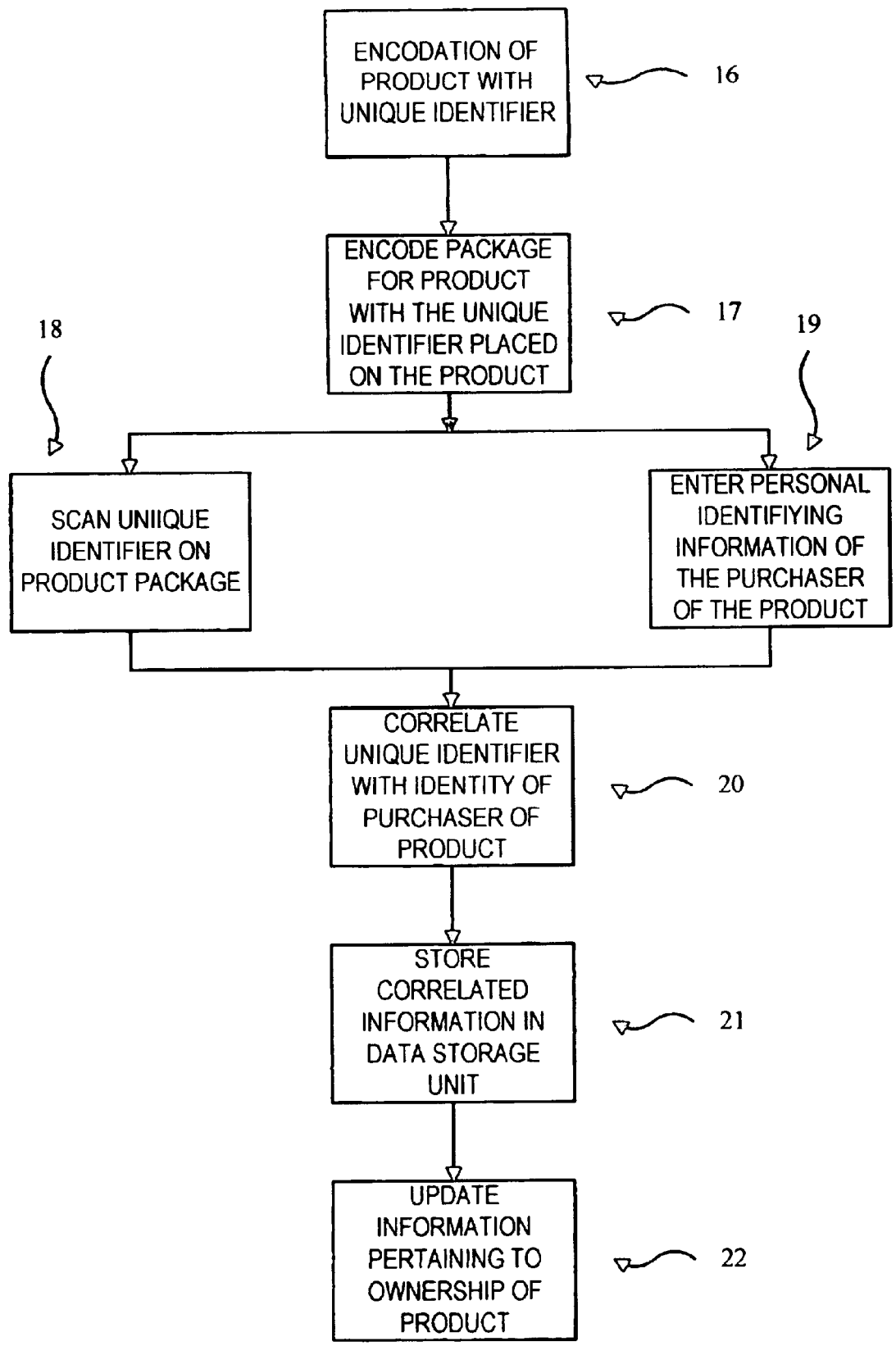
FIG. 2 is a block diagram illustrating a method for correlating the unique identifier on a product with consumer identification information.
Figure 3:
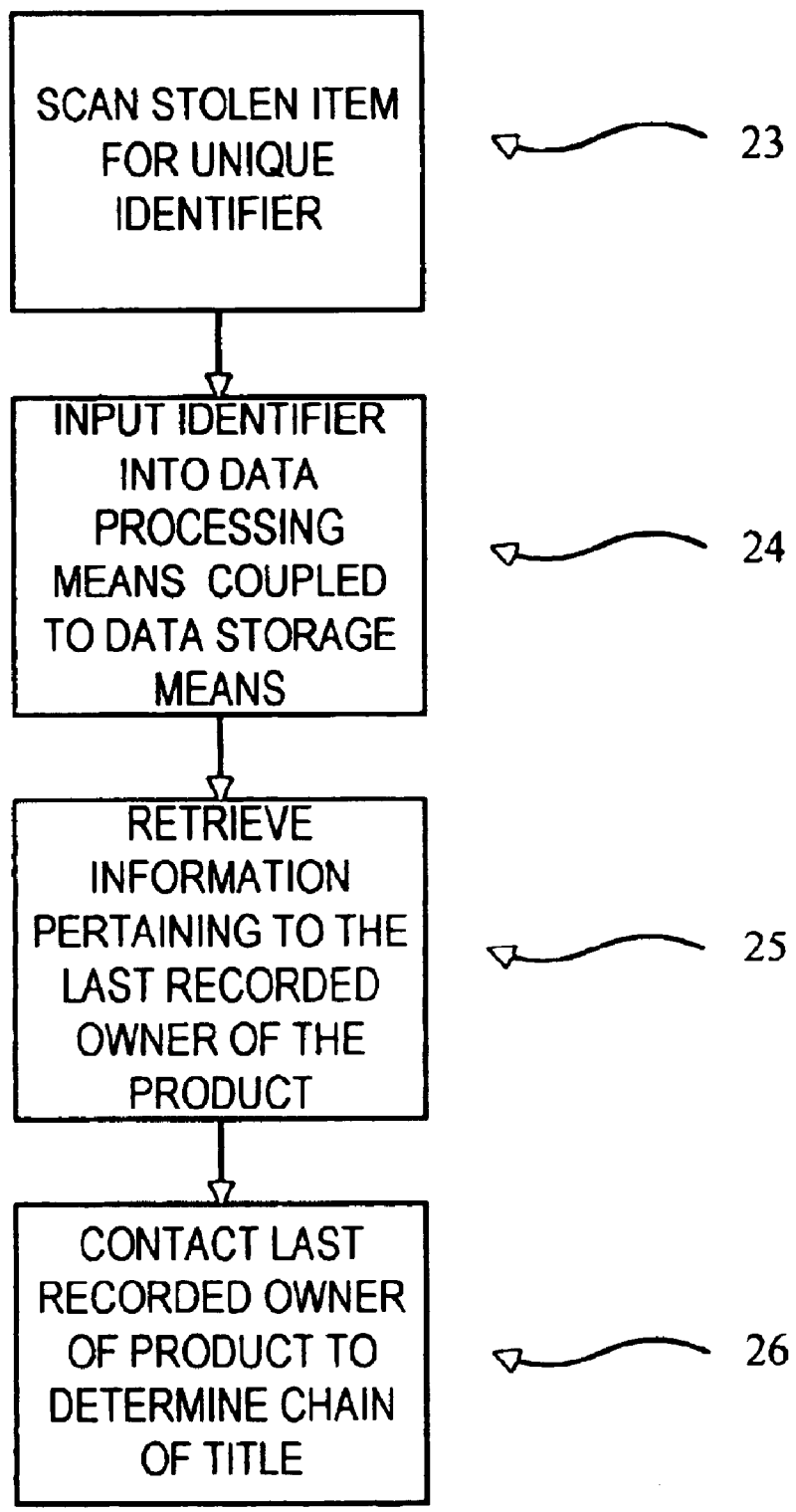
FIG. 3 is a block diagram illustrating a method for determining the identity of the owner of a product from the unique identifier on a product processed in the manner of FIG. 2.

Referring now to FIGS. 2 and 3, there is presented in block diagram form an exemplary method for correlating a product with the purchaser of that product after theft or loss of the product. The product is encoded with a unique identifier (16) which may be concealed, non-concealed, visible or invisible. A product is placed in a container upon which is placed a visible electronically-readable package identifier correlatable with, or identical to, the unique identifier on the product (17). Such package identifier may also include identifiers incorporated onto a tag, label or other such item. The visible package identifier is scanned by means of a scanner at the point of purchase of the product by the purchaser of the product (18). A credit card, draft or other identifying card containing information which is convertible into a digital data stream, is scanned to produce digitalized identifying data with respect to the person purchasing the product (19). The personal identifying information is correlated with the unique product identifier (20) and the correlated data is stored in a data storage unit (21). Information pertaining to ownership can be updated (22) by inputting the same unique identifier with new purchaser personal information. If an item is stolen, the position of the unique identifier is determined by scanning the item for the mark (23). The identifier is then input into a data processing means coupled to the data storage unit in which resides the product unique identifier information coupled to the purchaser identification information (25). Information pertaining to the last recorded owner of the product is retrieved and contact with the recorded owner is made in order to ascertain the true owner (26).

Figure 4:
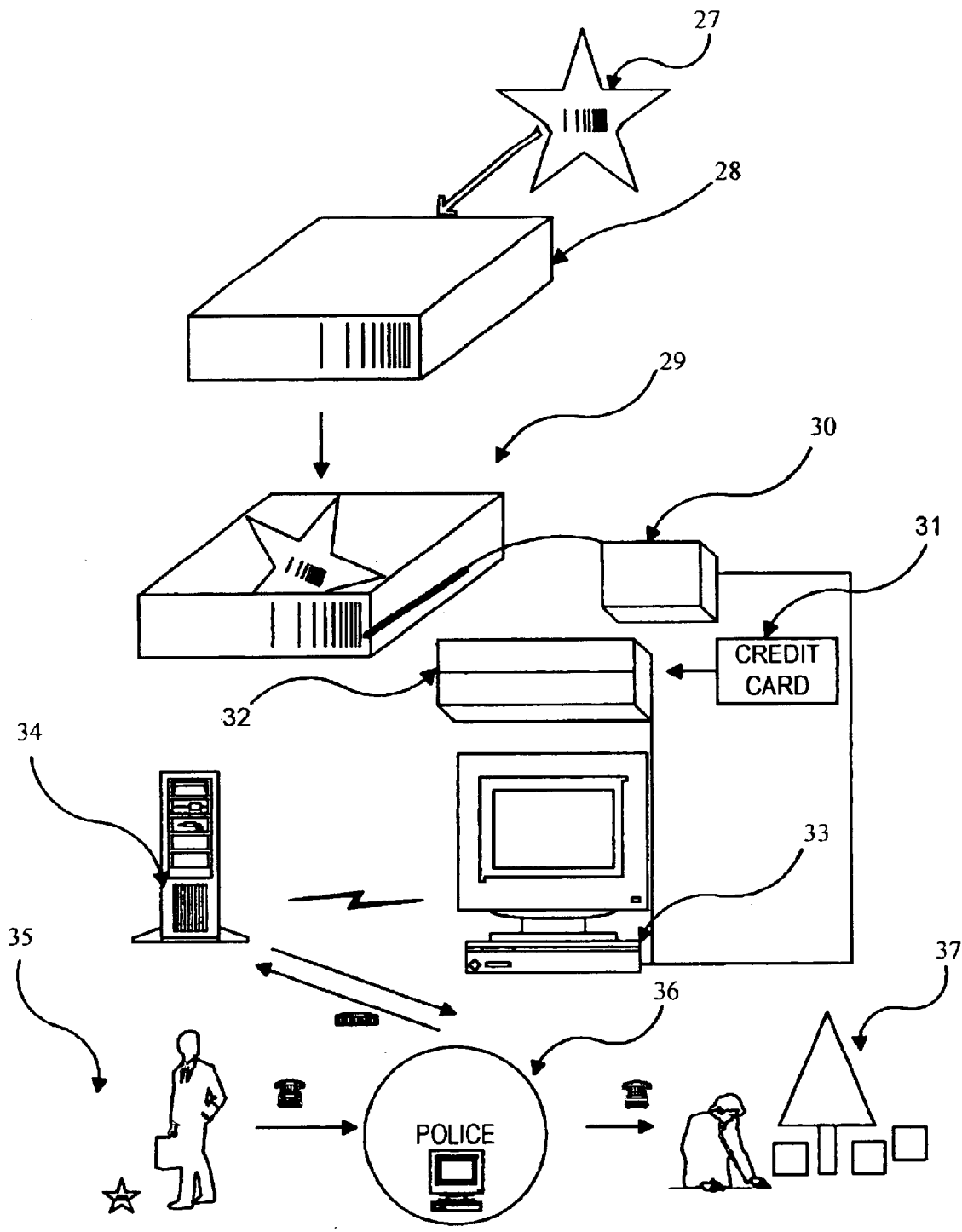
FIG. 4 is a schematic of the method of the present invention wherein unique product identifier information is readily available to the cashier by means of imprinting the same on the package in which the product is sold.

Referring now to FIG. 4, there is shown a schematic of the method of the present invention. Product 27, in this case a star, is encoded with a unique identifier which identifies that particular star. It should be understood that the identifier can encompass both the Universal Product Code and a special identifying serial number thereafter. Product 27 is placed in package 28 to which is applied code which is correlateable to or identical to the unique identifier on product 27. The clerk ringing up the sale scans by scanning means 30 in an electronically-readable product identifier on package 29, or the same incorporated on from a tag, label etc., and inserts a credit card 31, license or other personal identifying card into card reader 32. Personal information as well as product identifier information is correlated with one another and such correlated information is stored in data storage unit 33. Periodically such correlated information is sent to central data storage unit 34. Upon finding of an item 35 the item may be provided to authorities 36, who upon consulting data storage unit 34, may determine and contact the last recorded owner 37.

Figure 5:
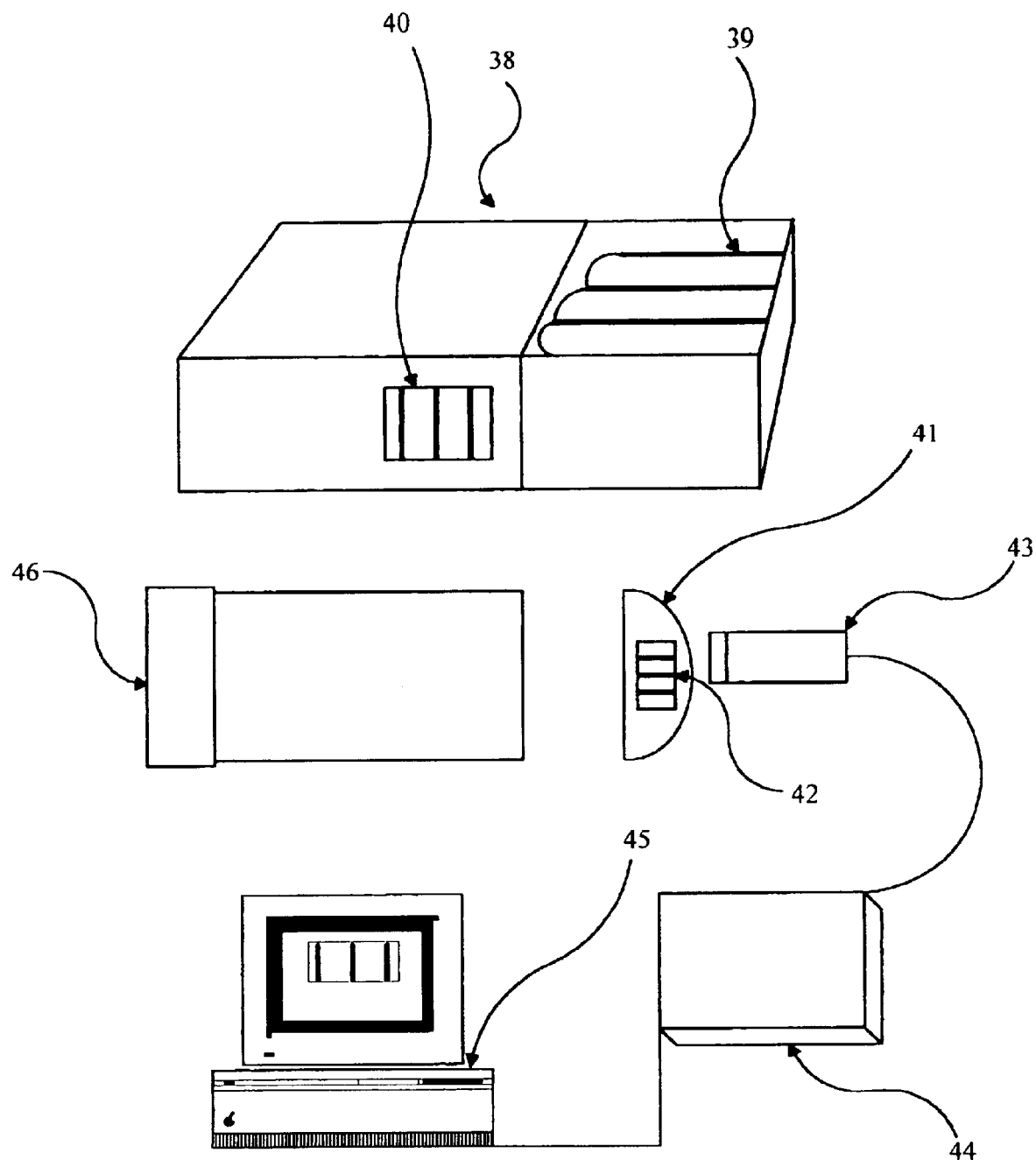
FIG. 5 is a schematic demonstrating a process by which a unique product identifier concealed under the surface of materials comprising a product is discerned.

FIG. 5 is a schematic demonstrating a means by which a unique product identifier concealed under the surface of materials comprising a product may be used to identify the perpetrator of a shooting. Bullets 39 are purchased in package 38 to which a unique product identifier 40 has been attached. Bullets 39 comprise shell 46 and slug 41. Slug 41 houses a unique identifier within the slug, such unique identifier correlating with the unique product identifier 40 on the package. Upon need to determine who fired slug 41 the slug is scanned by scanner 43 attached to a scan recording device 44 and/or data processing means 45. Scanning reveals the product identifier which may be correlated with the purchaser of the bullets by the means described above.

Figure 6:
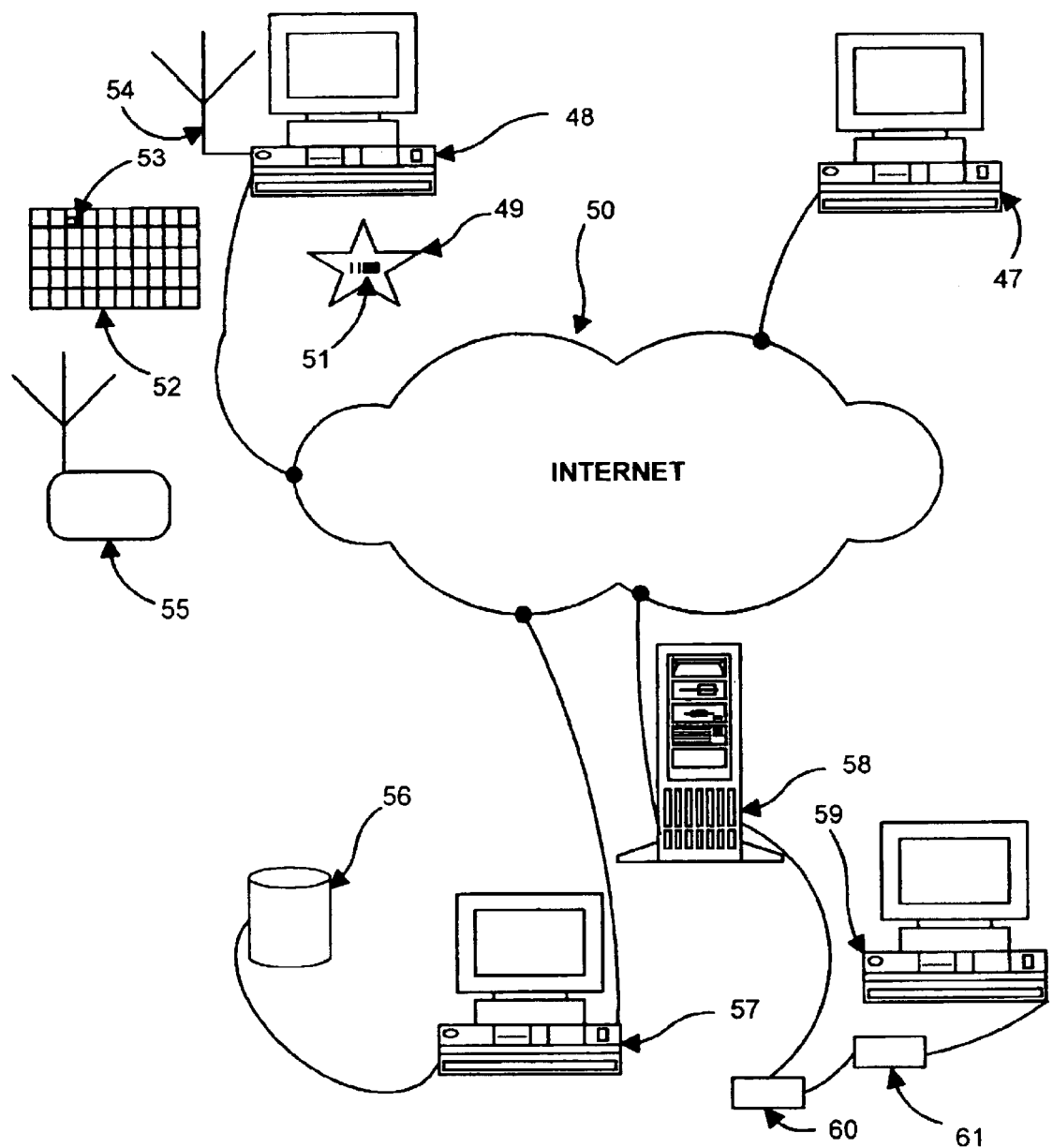
FIG. 6 is a schematic demonstrating an Internet application of the present invention, that is wherein the product is purchased or identified through the Internet.

Referring now to FIG. 6, there is shown a graphical illustration of computer systems connected by way of a data processing telecommunication network, in this case the Internet. Internet 50 is a network of millions of interconnected computers 47 including systems owned by Internet providers and information systems (e.g. BBS) 58 such as Compuserve or America Online. Individual or corporate users may establish connections to the Internet via any of the many ways known to those of ordinary skill in the art. For example, a user on a home computer 59 may through a modem 61 dial up an Internet Service Provider 58 to connect to a high speed modem 60 which in turn provides a full service connection to the Internet. The user may seek good information from a good provider by connecting to a provider's computer 57 by way of the Internet.

In one embodiment of the present invention the user provides a purchaser identifier in the process of ordering a good from the provider. The provider receives other information from the purchaser concerning the type of good (i.e., what product is desired) and quality of good which is being sought. The provider may then query its database 56 of already stored goods to determine if a particular good or group of goods having such qualities is/are already in stock. By previously having correlated the stored goods with the location of the stored goods in database 56, or other database, the provider may then contact by way of the Internet or other telecommunications, the warehouse where the desired good 53 is stored. Contact by the provider may be made directly with warehouse computer 48 which may store more exact information pertaining to the location of the desired good 53 in the warehouse, such as the exact bin where the good is stored in a series of bins 52. Correlation of the desired good 53 with a particular bin 52 may be stored in a relational database by scanning an electronically-readable package identifier on the package associated with the product, or a product information identifier itself, and an electronically-readable identifier associated with the bin in which the good is placed (e.g., placed in inventory). A request for pulling the good, and for shipping the same to the purchaser identified by way of the purchaser identifier, may be transmitted aerially to a site closer to the good in the warehouse, for example, to an automatic inventory pulling device 55 which may pull the product, and which may be responsible for transmitting information about the purchaser downstream to other devices which may process the good for mailing (or the pulling device may be involved itself in the packaging and/or labeling of the good for shipment). The good 49 may be incorporated into a package as a packaged product 53. Packaged product 53 may include a unique package identifier which correlates with a unique product identifier 51 on the good.

Figure 7:
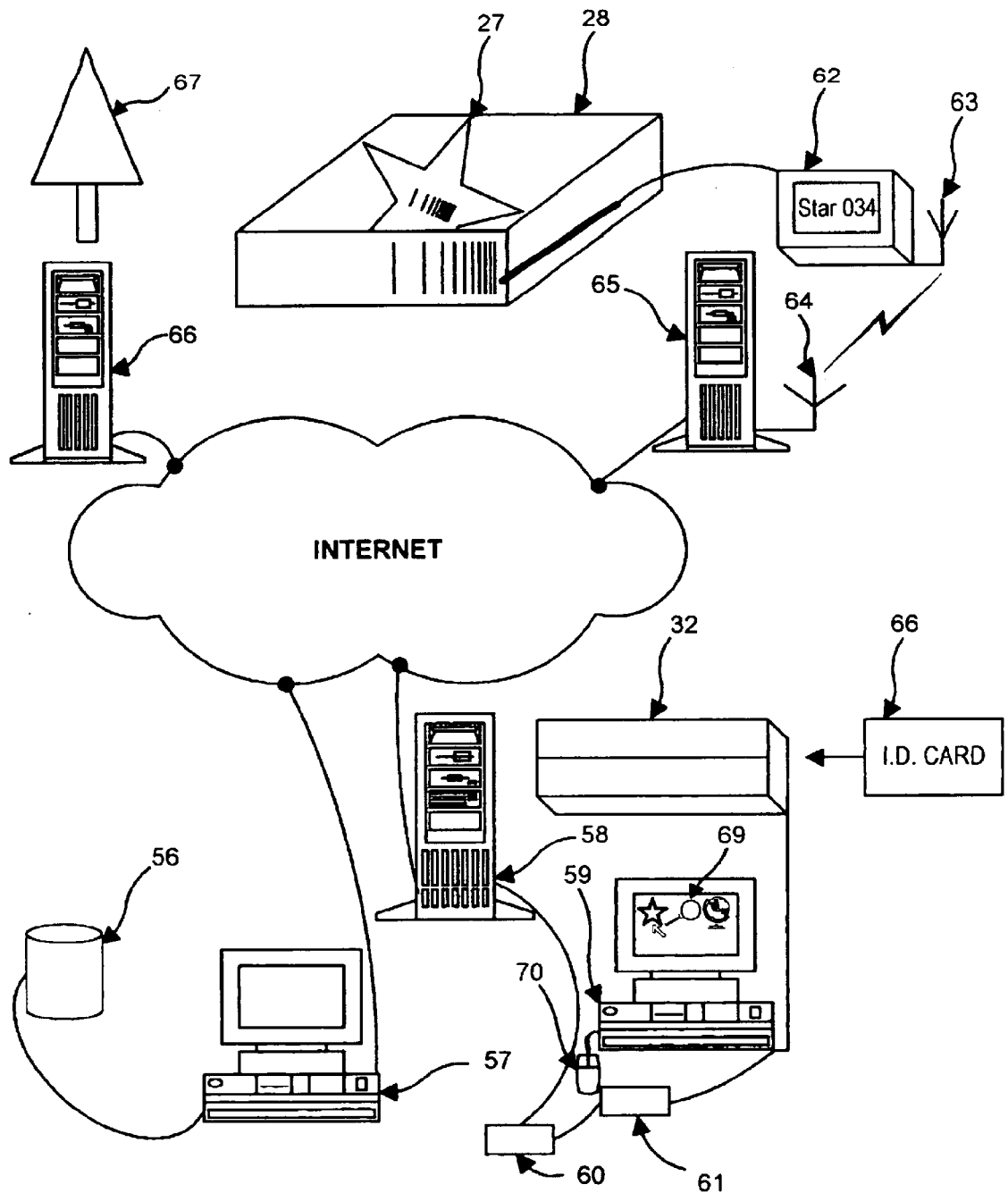
FIG. 7 is a schematic demonstration of an Internet application of the present invention, wherein the product is purchased or identified through the Internet, and the last registered owner of the product is determined by means of accessing a data base connected to the Internet.

Now referring to FIG. 7, there is shown a graphical illustration of another data processing telecommunication network embodiment of the present invention. In this embodiment a purchaser purchases from a catalog of products which may be depicted on the purchaser computer screen 69 by choosing from the catalog of products, as for example, by clicking the picture or icon on a mouse 70. Identity of the person selecting the item for purchase may be determined from the Internet Address of the purchaser's home computer 59, a URL address, an e-mail address, a home computer 59 identity number uniquely associated with the computer, by requesting input of identifying information of the purchaser (e.g., name, address, and credit or debit card number), or by more exacting means, such as by way of an electronically readable, preferably coded, identity card which may be read by an electronic reader operatively connected to the consumer's home computer 59 (e.g. a Smart Card reader coupled to a computer, and a Smart Card containing identity information read). Identity can also be authenticated by digitizing a retinal scan, a finger print, or requesting the person sign the person's signature by means of an electronic interface device coupled to the consumer's home computer 59. Preferably any identity information should include the mailing address of where the product is to be sent. Provider's computer 57, preferably stores the person identification information (preferably including the mailing address of where the product is to be sent) in a database 56 connected thereto. Provider's computer 57, alternatively or in conjunction with such storage, may pass the identity information along with an order for the item chosen for consumption to a source where the product chosen may be obtained. Preferably this source is also connected to the Internet by coupling one or more of its processors 65 to the Internet. Source processor 65 may automatically correlate the purchaser identification information with a unique product identifier, and/or unique package identifier, and/or product information identifier which has already been applied to a product, and notify inventory control personnel, or an automatic inventory pulling device, that a particular item with such identifier attached be pulled and shipped to the consumer requesting the product. Alternatively, the source processor 65 may transmit information pertaining to the order (such information which may include the purchaser identification information), for example, aerially by means of an antenna 64, to a processor 62 which is found closer to the inventory being sought (which processor 62 is also equipped with an antenna 63). The unique product identifier and/or unique package identifier, and/or product information identifier, may be read from the package 28 housing the good sought, in this case star 27, and such information sent by processor 62 at the inventory site back to the source processor 65, where such information may be correlated in a data base with the purchaser identification information. Such correlated information may be stored solely at the inventory site, or may be transmitted to the provider's computer 57, the Internet Service Provider 58 processor, the consumer's home processor 59, or a third party processor. Other information, such as day and time of the purchase, and for whom the purchase of the good was made, may also be provided along with the purchaser identification information and the information pertaining to the product. Preferably at the provider's site, but optionally at other sites connected to the data processing telecommunications network (such as at the source, the Internet Service provider, or the purchaser's site), a relational database is maintained associating the good ordered with associated characteristics of the good, for example, add-ons associated with the good and/or good requirements for use of the good (e.g. batteries) and secondary purveyors selling goods and/or services related to the associated characteristics of the good. In this example, a Christmas Tree 67 manufacturer is contacted through its processor 66 upon ordering of the good, star 27, to determine if the Christmas Tree manufacturer wishes to be make an offer to the person who is purchasing the star.

Figure 8:
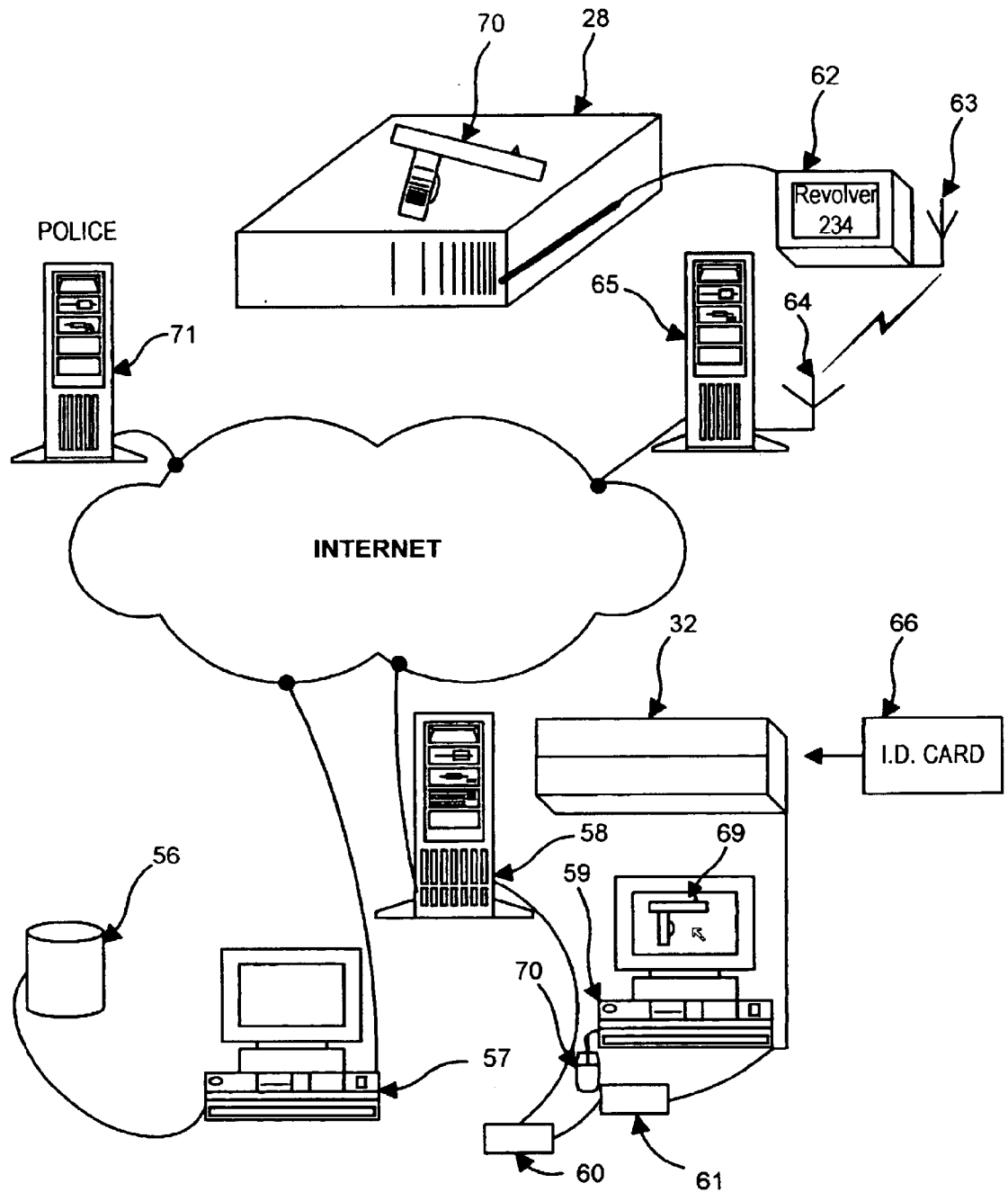
FIG. 8 is a schematic demonstration of an Internet application of the present invention, wherein the purchaser of a gun is registered with the authorities.

Referring now to FIG. 8, there is shown a graphical illustration of yet another data processing telecommunication network embodiment of the present invention. In this embodiment, a consumer purchases a product through an e-commerce application. For example, consumer may access a provider's database 56 through user's home computer 59 via an Internet Service Provider 58. The user may seek good information from the purveyor's computer 57 connected to the Internet. The provider may provide a plurality of pictures or icons, such as of a gun 69, which may be chosen for purchase, as for example, by clicking the picture or icon on a mouse 70. Identity of the person selecting the item for purchase may be determined from the Internet Address of the consumers home computer 59, URL address, home computer 59 identity number uniquely associated with the computer, by requesting input of identifying information of the purchaser (e.g., name, address, and credit or debit card number), or by more exacting means, such as by way of an electronically-readable, preferably coded, identity card which may be read by an electronic reader operatively connected to the consumer's home computer 59 (e.g. a Smart Card reader coupled to a computer, wherein the Smart Card contains identity information etc.). Identity can also be confirmed by digitizing a retinal scan, a finger print, or requesting the person sign the person's signature by means of an electronic interface device coupled to the consumer's home computer 59. Preferably any identity information should include the mailing address of where the product is to be sent. Purveyor computer 57, preferably stores the purchaser identification information (preferably including the mailing address of where the product is to be sent) in a database 56 connected thereto. The provider, alternatively or in conjunction with such storage, may pass purchaser identification information along with an order for the item chosen for consumption to a source where the product chosen may be obtained. Preferably this source is also connected to the Internet by coupling one or more of its processors 65 to the Internet. Source processor 65 may automatically correlate the purchaser identification information with a unique product identifier, and/or unique package identifier, and/or product information identifier which is already been applied to a product, and notify inventory control personnel that a particular item with such identifier attached be pulled and shipped to the consumer requesting the product. Alternatively, the source processor 65 may transmit information pertaining to the order (such information which may include the identity information), for example, aerially by means of an antenna 64, to a processor 62 which is found closer to the inventory being sought (which processor 62 is also equipped with an antenna 63). The unique product identifier and/or unique package identifier, and/or product information identifier, may be read from the package 28 housing the item sought, in this case gun 70, and such information sent by the processor 62 at the inventory site back to the source processor 65, where such information may be correlated in a data base with the purchaser identification information. Such correlated information may be stored solely at the inventory site, or may be transmitted to the purveyor's computer 57, the Internet Service Provider 58 processor, the consumer's home processor 69, or a third party processor, for example, a processor 71 accessible to the police, and stored on in a data base accessible to any or all of such processors. Other information, such as day and time of the purchase, and from whom the purchase was made, may also be provided along with the correlated purchaser identification information and the product purchased information. For example, a processor 71 at a police station may receive information via the Internet that a certain gun bearing a unique serial number, preferably concealedly encoded, was purchased by John Smith of 77 Ann Arbor Street, New York, N.Y. 11111 at 5:00 p.m. on May 1, 2002 from MAX GUNS, 1 Battle Street, Ammo, Tex. 222222. Thus, if the gun was found at the scene of a crime, the police could determine who was the last registered owner of the gun, the address of the last registered owner, and when and where the purchase of the gun was made by the last registered owner. Of course, one or more Internet communications in such embodiment, and other Internet embodiments, may employ digital encryption technology.

There are many possible modifications and changes which could be made to the system described without straying from the applicant's present invention. Such modifications would be obvious to those skilled in the art and should not limit the scope of applicant's claimed invention. Unless specifically stated otherwise in the prosecution of any claim (appended hereto, or subsequently amended or added by the applicant), the applicant does not intend to restrict any of the claims to any specific structure set forth within the examples by invoking 35 U.S.C. §112, Paragraph 6. Rather, the examples set forth herein are for illustration only, and encompass only a small number of embodiments within the scope and spirit of the present invention.

What is claimed is:

1. A computer-assisted method of recording an identity of a purchaser of a particular item in a retail setting comprising:
   accepting from a purchaser at a point of retail sale an item encoded with a unique item identifier, said item identifier identifying the manufacturer of said item and comprising indicia specific to said item, said item being enclosed in a package having a visible electronically-readable coded form package identifier correlateable with said indicia specific to said item;
   accepting from said purchaser of said good at a point of retail sale an identity card housing electronically-readable personal identification information;
   inputting at the point of sale by an electro-optical reader said personal identification information from said identity card into electronic storage;
   inputting at the point of sale by an electro-optical reader into said electronic storage said visible electronically-readable coded form package identifier and information pertaining to the manufacturer of said item;
   correlating said personal identification information with said package identifier and information pertaining to the manufacturer of said item in a computer database.

2. The method of claim 1 further comprising the step of transferring said correlated data to a shared database with other retailers.

3. The method of claim 1 further comprising the step of: providing at least a portion of said unique item identifier to the purchaser in electronically readable coded form on a medium.

4. The method of claim 3 further comprising the step of: printing said package identifier and said personal identification information on a sales receipt in electronically readable coded form.

5. The method of claim 1 wherein the item identifier is invisible in visible light.

6. The method of claim 1 wherein the identity card is a self-authenticating electronically-readable coded identity card.

7. The method of claim 1 wherein the identity card is a microcircuit technology card.

8. A process for encoding an item with an identifier uniquely correlateable with said item comprising:
   coding an item with an unique item identifier in electronically-readable coded form, said unique item identifier identifying the manufacturer of said item and comprising indicia specifically identifying said item;
   on said item or the packaging of said item, placing a package identifier, in visible electronically-readable coded form, which is correlateable with said unique item identifier, said package identifier identifying the type of item, the item's manufacturer, as well as identifying said indicia on said item.

9. The process of claim 8 wherein the unique item identifier associated with the item is invisible.

10. The process of claim 8 wherein the unique item identifier's position on said item is associated with the lot in which said item was manufactured.

11. The method of claim 8 wherein said visible electronically-readable package identifier which is placed on said item or the packaging of said item further identifies origin of manufacture.

12. A product made by a process comprising:
   coding an item with an unique item identifier in electronically-readable coded form, said unique item identifier identifying the manufacturer of said item and comprising indicia specifically identifying said item;
   on said item or the packaging of said item, placing a package identifier, in visible electronically-readable coded form, which is correlateable with said unique item identifier, said package identifier identifying the type of item, the item's manufacturer, as well as identifying said indicia on said item.

13. A computer-assisted method of identifying a record owner of the item, or part thereof, of claim 12 comprising:
   obtaining the item;
   determining the unique item identifier encoded on said item;
   inputting said unique item identifier into a data processor operatively connected with a data base housing purchaser identity information correlated to unique item identifiers found on a plurality of items;
   retrieving purchaser identity information correlated with said unique item identifier in said data base;
   determining the identity of the purchaser(s) of said item from said purchaser identity information.

14. The product of claim 12 wherein said package identifier further comprises information pertaining to characteristics of the item.

15. The product of claim 14 wherein said package identifier comprises information pertaining to the dimensions or features of the item.

16. The product of claim 14 wherein said package identifier comprises information pertaining to add-ons associated with the item.

17. A processor-assisted method of recording the identity of a purchaser of an item, having an unique item identifier thereon containing indicia specifically identifying the particular item, purchased through a data processing telecommunications network comprising:

receiving over a data processing telecommunications network a digital data signal comprising digital information relating to the order of a good, the identity of the orderer of the good, and the address to which the orderer of the good desires the good to be transmitted, said digital data signal being transmitted from said orderer to a purveyor of said good;

transmitting from said purveyor, in response to said offerer's order, a digital data signal comprising a request for said good to a processor located at a site at which such good is physically available in a package said package having a package identifier in electronically-readable coded form correlateable with an unique item identifier said unique item identifier associated with the particular item comprising the packaged good, and comprising information identifying the manufacturer of said item and indicia specifically identifying said item;

receiving a digital data signal from form the site at which such good is physically available comprising digital information with respect to the package identifier; and correlating in a database said package identifier digital information with said digital information pertaining to the identity of the offerer and the address to which the offerer desires the good to be transmitted.

18. A method for encoding concealed unique identifiers on products comprising:

directing one or more high energy electromagnetic waves at a material in a molten or semi-molten state such that the wave(s) substantially converge at a point within the material;

altering the convergence point of said high energy electromagnetic wave(s) such that the three-dimensional structure of the molten or semi-molten material is disrupted such that an unique identifier is formed;

using the solidified material in the construct of a product.

19. The method of claim 18 wherein the molten or semi-molten material is a plastic.

20. A process for ascertaining whether an item having a unique item identifier in electrically-readable coded form, said unique item identifier identifying the manufacturer of said item and comprising indicia specific to said item, is the same item that is identified by information in electronically-readable coded form on a medium, said process comprising the steps of:

a) comparing said unique item identifier on said item with the electronically-readable coded form information on said medium;

b) determining that said item having said unique item identifier is the same as said item identified on said medium if the unique item identifier favorably compares with the electronically-readable coded form information of step a.

* * * * *